Dec. 22, 1959   G. E. GUNDERSON ET AL   2,917,949
TRANSMISSION

Filed June 14, 1954   3 Sheets-Sheet 1

INVENTORS
GUNNAR E. GUNDERSON
HUBERT HOLLMANN
BY Fidler, Crouse & Beardsley
ATTORNEYS

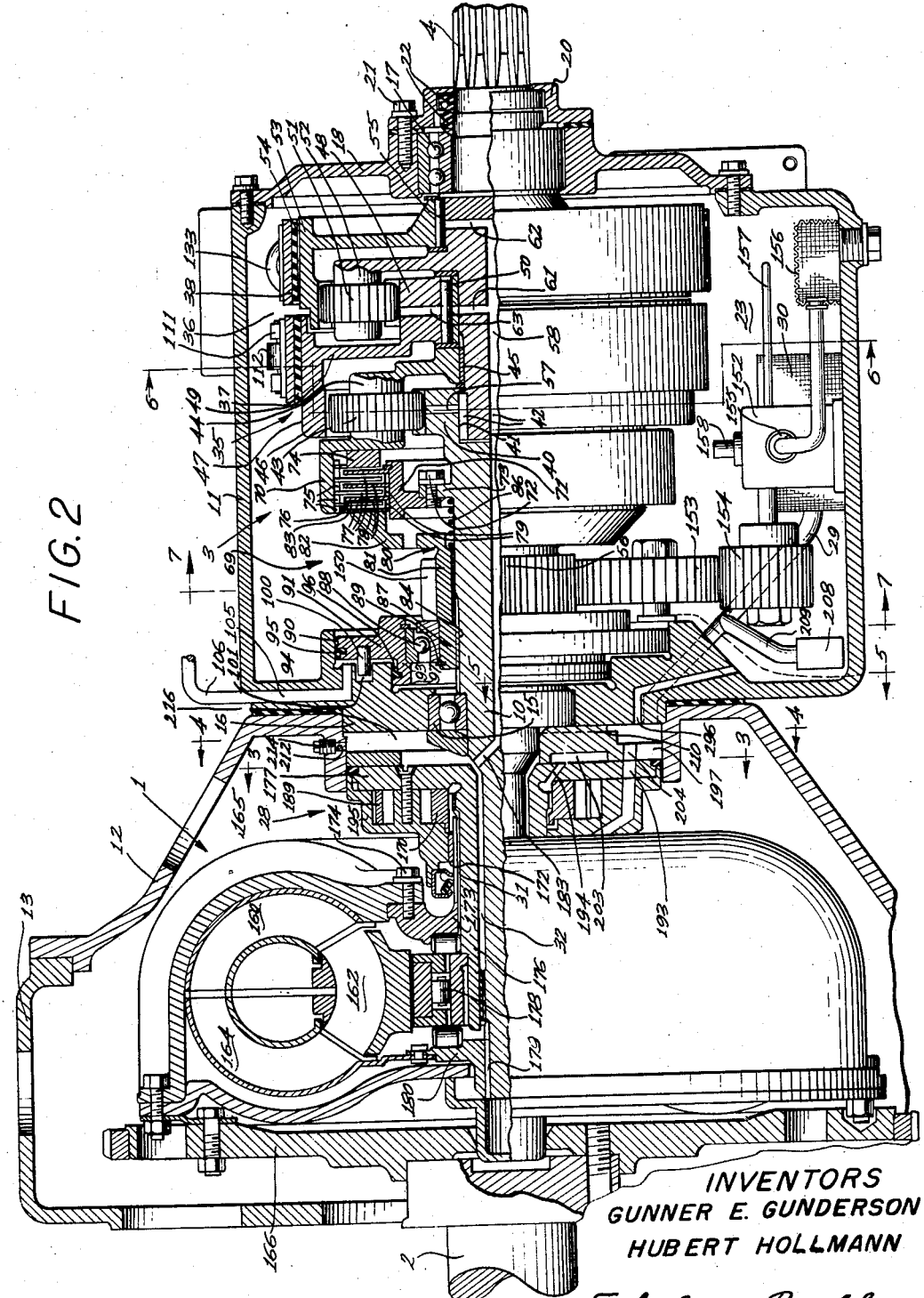

Dec. 22, 1959    G. E. GUNDERSON ET AL    2,917,949
TRANSMISSION
Filed June 14, 1954    3 Sheets-Sheet 3

INVENTORS
GUNNAR E. GUNDERSON
HUBERT HOLLMANN
BY Fidler, Crouse & Beardsley
ATTORNEYS United States Patent Office
2,917,949
Patented Dec. 22, 1959

2,917,949
TRANSMISSION

Gunnar E. Gunderson, Lemont, and Hubert Hollmann, Riverside, Ill., assignors to Brad Foote Gear Works, Inc., Chicago, Ill., a corporation of Delaware Application June 14, 1954, Serial No. 436,312

9 Claims. (Cl. 74—730)

The present invention relates generally to power transmissions and has more particularly to do with a variable ratio torque converter and controls therefor especially adapted for driving motor vehicles.

Change gear transmissions that utilize conventional sliding gears for changing from one torque ratio to another do not function satisfactorily where it is desired to change torque ratio smoothly and rapidly and without disconnecting the load from the power source. Lift trucks, for example, must be operated without any sudden movements when carrying suspended loads, particularly on inclines, in order not to cause the suspended load to swing and oscillate and thereby upset the truck. In the case of motor vehicles employed to carry heavy loads over long inclines, conventional gear transmissions make it necessary to shift down into low gear at a point on the incline where the vehicle still can be driven in high gear and hence at a much greater speed, in order to make allowance for the momentum lost during the clutching operation.

It is a general object of the present invention to provide a novel and improved type of transmission wherein the torque ratio may be smoothly and rapidly changed with substantially no loss in momentum of the load operated therefrom.

Another object of the invention is to provide a novel planetary gear transmission having a neutral position, two forward speeds and one reverse speed.

Another object of the invention is to provide a novel variable ratio torque converter including in combination a compound planetary gearing mechanism and a fluid torque converter mechanism directly connected to the prime mover.

Another object is to provide novel variable ratio torque converter including in combination a compound planetary reverse gearing mechanism and a fluid torque converter mechanism, together with novel controls for smoothly and rapidly changing the torque ratio transmitted between low, high and reverse drives.

Another object is to provide a novel compound planetary reverse gear unit several of which may readily be connected in tandem for multiplied control of a driven member.

Another object is to provide a compound planetary gear unit provided with torque ratio controls including clutching means for direct drive, the driving member of which clutching means includes a power take-off member which may be used for driving a hydraulic pump to provide fluid pressure for operating the torque ratio controls, and which serves as a convenient drive directly from the output of the fluid torque converter independent of the planetary gearing.

A still further object is to provide a novel clutch for locking one stage of a planetary gearing.

A still further object of the invention is to provide a novel and simple brake mechanism for selectively braking elements of a planetary gearing.

These and other objects and advantages of our invention will be apparent from the following description of an embodiment thereof illustrated in the accompanying drawings, wherein:

Fig. 2 is a vertical, longitudinal, partly sectional view taken substantially along line 2—2 of Fig. 1;

Figure 1:
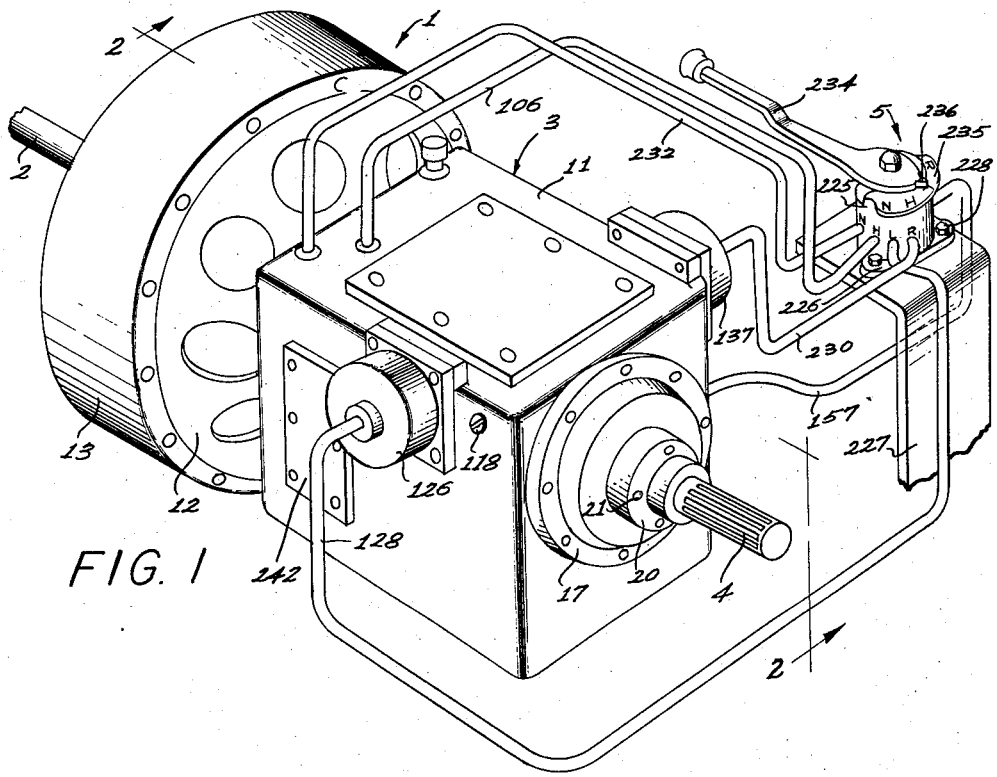
Fig. 1 is a perspective external view of our transmission shown schematically connected by fluid lines to an operating valve therefor.

Referring to Fig. 1, the transmission unit comprises generally a fluid torque converter 1 driven from a driving shaft 2 such as the engine crankshaft of a motor vehicle and a compound reverse planetary gear transmission unit 3 driving a splined output shaft 4 and controlled by a manually operable hydraulic valve 5 which may be located at any convenient operating position either adjacent the transmission unit or at a place remote therefrom. The planetary gear transmission is mounted within a housing 11 secured to a housing flange 12 which in turn is securely bolted to the engine flywheel bell housing 13.

As shown in Fig. 2, the gear transmission unit 3 is connected to the fluid torque converter 1 by an intermediate shaft 10 journaled in a bearing 15 mounted within an end wall 16 of the gear transmission housing 11. The output shaft 4 of the gear transmission unit is journaled in a bearing 17 mounted in a face plate 18 closing off the front end of the transmission housing 11. The bearing 17 is retained in the face plate 18 by means of a bearing cap 20 secured to the face plate by a plurality of bolts 21. The usual fluid seals 22 for preventing oil from escaping from the unit are disposed within the bearing cap 20. The transmission housing 11 is provided with a sump 23 for storing and collecting the lubricating oil for the planetary gear transmission 3, which oil is also used as the working fluid for the hydraulic torque converter. A gear type pump 28 (Fig. 3) draws oil from the sump 23 through a conduit 29 connected to a strainer 30 and circulates it through the fluid torque converter unit 1 and through the lubricating passages of the planetary gear transmission 3.

The planetary gear transmission 3 comprises two gear trains or stages, namely, a low forward speed stage 35, and a low reverse speed stage 36. Both stages are orbit braked and are provided with brake bands 37 and 38, respectively, controlled by brake mechanisms to be described hereinafter.

The sun gear 40 of the planetary stage 35 is shown as being formed integrally with the intermediate shaft 10 whose forward end (right-hand end as viewed in Fig. 2) is provided with a forwardly opening central recess 41 for receiving roller bearings 42 for journaling the rear end of the output shaft 4 within the recess. A plurality of planet gears 43 are rotatably mounted on a planet carrier 44 mounted on the output shaft 4 by means of a splined connection 45. The orbit gear 46 of stage 35 is formed with an external cylindrical braking surface 47 and is rigidly connected to a sun gear 48 of stage 36 through a radially extending integral connecting portion 49. The sun gear 48 and the orbit gear 46 formed integrally therewith are rotatably journaled on the output shaft 4 by means of roller bearings 50. A plurality of plant gears 51 are rotatably mounted on a planet carrier 52 formed integrally with the output shaft 4. The orbit gear 53 of the stage 36 is provided with a braking surface 54 and is journaled on the output shaft 4 by means of roller bearings 55.

The first stage 35 of the planetary gearing is supplied with lubricating oil through a lubricating conduit 56 in the shaft 10, which communicates with one or more fluid conduits 57 which extend radially through the sun gear 40 and through the roller bearings 42. The roller bearings 50 and 55 are supplied with lubricating oil through respective conduits 61 and 62 which extend radially through the output shaft 4 and which are connected to a conduit 58 in the shaft 4. The various gear elements of the stage 36 of the transmission are lubricated through one or more conduits 63 in the sun gear 48 communicating with the roller bearings 50.

A disc clutch generally indicated at 69 is provided for the purpose of establishing a direct drive connection between the intermediate shaft 10 and the output shaft 4 through the planet carrier 44 of stage 35. The disc clutch 69 includes an internally splined hollow cylindrical driven member 70 rigidly secured to the planet carrier 44 and an externally splined cylindrical member 71 disposed within the driven member 70 and rigidly mounted on the intermediate shaft 10 by means of bolts 72 extending through a radial flange 73 on the intermediate shaft 10. The disc clutch 69 is provided with a backing member 74 having a splined connection with internal splines 75 of the driven clutch member 70 and a disc pack generally indicated at 76. The disc pack 76 is made up of alternately disposed discs 77 having a splined connection with the internal splines 75 of clutch member 70 and discs 78 having a splined connection with external splines 79 of the driving clutch member 71.

A combined clutch actuating member and power take-off member 80 includes a cylindrical hub portion 81 and a radially extending flange portion 82 formed with a ring surface 83 in a plane transverse to the axis of rotation of the shaft 10 for engaging the rearmost disc of the disc pack 76. The member 80 is mounted on the shaft 10 for rotation therewith by means of a spline connection 84 which permits the actuating member to slide on the shaft in an axial direction. A compression spring 86 is interposed between the member 80 and the side of the flange 73 on the drive shaft 10 to bias the actuating member 80 away from the disc clutch normally to permit free relative rotation between the driven clutch member 70 and the driving clutch member 71. The clutch actuating member 80 is formed with a rearwardly extending cylindrical shoulder 87 for mounting a ball bearing 88, which is retained in place by means of a retaining ring 89. A circular cylindrical recess 90 is provided in the rear wall 16 of the cylindrical housing 11 for receiving a ring piston 91 therein, and a circular cylindrical recess 92 of smaller diameter and deeper than the recess 90 is provided for receiving a reduced diameter, rearwardly extending cylindrical shoulder 93 of the piston 91 to form an annular ring-shaped fluid chamber 94 between the piston and the bottom surface of the recess 90. The piston 91 is provided with oil seals 95 and 96 that engage the inner cylindrical surfaces of recesses 90 and 92, respectively, in order to prevent the escape of hydraulic fluid pressure from the annular ring chamber 94. The piston 91 is provided with a plurality of rearwardly extending guide pins 100 received within openings 101 in the housing wall 16 for the purpose of restraining the piston against rotation. The piston 91 is shown in Fig. 2 in its most rearward position. A conduit 105 extends through the end wall 16 and connects the compression chamber 94 with a fluid line 106 leading to the control valve 5 (Fig. 1). The piston 91 is movable between the position shown in Fig. 1 and a position wherein it displaces the clutch actuating member 80 against the opposing force of the spring 86 to press the alternately disposed discs 77 and 78 of the disc pack 76 against each other and against the backing member 74 to drivingly connect the driving clutch member 71 to the driven clutch member 70. When the disc clutch 69 is thus engaged, the intermediate shaft 10 is rigidly connected to the output shaft 4 through the planet carrier 44 and the spline connection 45.

Figure 6:
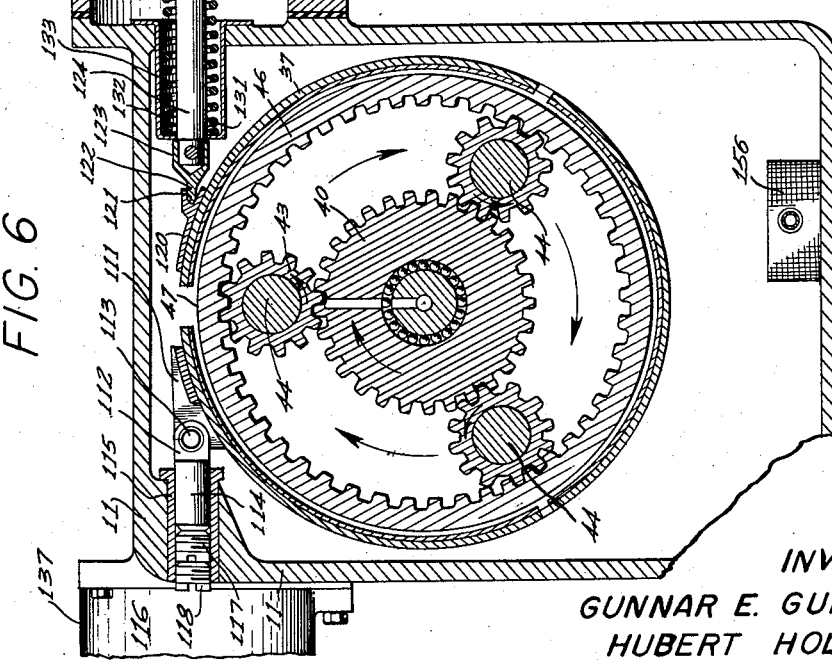
Fig. 6 is a transverse sectional view taken along line 6—6 of Fig. 2 showing the brake mechanism for controlling one state of the planetary gear transmission.

With the disc clutch disengaged, the planetary gear transmission drives output shaft 4 in low forward speed when the orbit gear 46 of the planetary stage 35 is held stationary with respect to the planetary gear housing 11 and drives the output shaft 4 in reduced reverse speed when the orbit gear is held stationary. The mechanisms for selectively braking orbit gears 46 and 53 are identical and the construction thereof will be described with reference to Fig. 6 which shows the brake mechanism of the stage 35. The brake band 37 encircles all but a small portion of the circumference of the brake drum 47 of the orbit gear 46. A clevis 111 is rigidly secured to one end of the brake band 37 in order to adjustably anchor this end with respect to the gear casing 11. A brake adjustment rod and anchor member 112 is pivotally connected to the clevis 111 by means of a clevis pin 113 and is provided with a cylindrical shank 114 which is slidably received within a bushing 115 disposed in an opening 116 provided therefor in the side wall of the casing 11. A large clearance is provided between the clevis pin 113 and the brake adjustment rod 112 in order to permit free movements of the rod within the bushing 115. The bushing 115 is provided with internal threads at the outer end thereof for receiving a threaded brake adjusting screw 117 and a locking screw 118. The other end of the brake band 37 is provided with a clamp 120 having an outwardly facing recess 121 for receiving the pointed end 122 of a brake actuating member 123. The brake actuating member 123 is rigidly secured to the forward end of an actuating rod 124 connected to a piston 125 which is slidably mounted within a brake actuating cylinder 126. The cylinder 126 is rigidly secured to the side of the housing 11 by a plurality of flange bolts 127. A fluid line 128 connected to the valve 5 (Fig. 1) communicates with the space 130 between the piston 125 and the end wall 129 through an opening extending through the end wall. The piston 125 is normally held in the position shown in Fig. 6 by means of a piston retracting spring 131 retained between the piston and an inwardly extending shoulder 132 of a retaining sleeve 133 secured within an opening 134 in the side of the housing 11. A ring seal 135 extends around the periphery of the piston 125 in order to form a fluid-tight seal between the piston and the cylinder 126.

The brake band is adjusted by adjusting the screw 117 within the sleeve 115, thereby displacing the anchor member 112 to impart a corresponding adjusting movement to the clevis 111 and to the end of the brake band 37. Fluid pressure applied against the right hand side of the piston 125 through the fluid line 128 displaces the piston to the left as viewed in Fig. 6 against the opposing force of spring 131 to impart a corresponding movement to the rod 124, the brake actuating member 122 and the bracket 120 secured to the end of the brake band 37. The tightening of the brake band 37 locks the orbit gear 45 securely in place with respect to the housing 11.

The stage 36 of the planetary gearing is provided with an identical braking arrangement which, for the sake of convenience, is arranged with the brake band clamping means and the brake band actuating means facing in opposite directions than those of the stage 35. The position of the brake actuating cylinder 137 of the stage is seen in Fig. 1.

When the disc clutch 69 (Fig. 2) is in released condition permitting free relative rotation between clutch members 70 and 71 and when both brake bands 37 and 38 for orbit gears 46 and 53, respectively, of the planetary gearing are released, the transmission is in neutral, and no power will be transmitted from the intermediate shaft 10 to the output shaft 4. For low forward speed drive, the brake band 37 is tightened to clamp orbit gear 46 in place while leaving the brake band 38 of the stage 36 released and the clutch 69 disengaged, thereby forming a drive connection between the intermediate shaft 10 and the output shaft 4 through the first planetary stage 35, the sun gear 40 constituting the driving member and the planet carrier 44, the driven member. For reverse drive, the brake band 38 is tightened to clamp the orbit gear 53 in place and the brake band 37 is released to permit unrestrained rotation of the orbit gear 46 of the stage 35. With the orbit gear 53 of stage 36 held stationary, the drive connection between the intermediate shaft 10 and the output shaft 4 will be through the sun gear 40 of the planetary stage 35, the orbit gear 46, the sun gear 48 formed integrally with the orbit gear 46, and the planet carrier 52 formed integrally with the output shaft 4. For direct forward drive, the brake bands 37 and 38 of the planetary stages 35 and 36, respectively, are released and the disc clutch 69 engaged thereby connecting the output shaft 4 directly to the intermediate shaft 10 through the clutch members 70 and 71, the planet carrier 44 rigidly connected to the clutch member 71 and the spline connection 45. It will thus be noted that only one of the actuating means for the transmission, namely, the clutch 69, the brake band 37 of the stage 35, and the brake band 38 of the stage 36 is actuated at a time.

Although the source of hydraulic pressure for actuating the disc clutch 69, the brake mechanism for the stage 35 and the brake mechanism for the stage 36 may be separate and apart from the transmission, we prefer to utilize the lubricant for the gear transmission and the operating liquid for the torque converter as the operating fluid for the various control mechanisms described and to drive the pump that produces the hydraulic pressure directly from the transmission in order to make the unit completely self-contained. In accordance with one feature of our invention we provide gear teeth on the cylindrical hub 81 of the actuating member 80 (Fig. 2) for the disc clutch 69 to form a spur gear 150 for driving a hydraulic pump 152 through an idler gear 153 rotatably mounted on the end wall 16 of the gear housing 11 in engagement with a drive pinion 154 of the pump. The intake 155 of the pump 152 is connected to a strainer 156 in the sump 23 of the housing 11 of the planetary gear unit and the output from the pump is connected to a fluid line 157. It is pointed out that the disc clutch actuating member 80 which is utilized to drive the pump is rotatably fixed on the intermediate shaft 10 so that it will always rotate therewith. The input of the fluid torque converter 1 is connected directly to the engine drive shaft 2 so that the actuating member 80, mounted on the intermediate shaft 10 for rotation therewith, will drive the pump 152 directly from the output of the fluid torque converter independently of the operating condition of the planetary gear unit 3. The gear ratio between the gear 150 and the pinion 154 is selected so that adequate pressure to operate the various controls is obtained when the engine to which the hydraulic torque converter is connected, is idling. A relief valve 158 is provided to prevent the pump from building up excessive pressures when the engine is running at full speed.

The fluid torque converter 1 (Fig. 2) may be of conventional construction selected to suit particular operating requirements of the transmission. The torque converter 1 illustrated herein by way of example includes an impeller or driving member 160, a stator or reaction member 162 and a runner or driven member 164. The impeller 160 is affixed to the torque converter housing 165 which in turn is bolted to the engine flywheel 166 rigidly secured to the forward end of the crankshaft 2.

The oil pump 28 includes a gear 170 which is mounted for rotation coaxially with respect to the intermediate shaft 10 (Fig. 3) and driven directly from the engine shaft 2 through a splined connection 172 with a sleeve member 173 secured to the fluid torque converter housing 165 by means of a plurality of bolts 174. The fluid torque converter is supplied with operating fluid from the pump 28 through the conduit 31 formed between the rotating sleeve member 173 and a stationary sleeve 176 formed integrally with a face plate 177 for the pump. The reaction member 162 is mounted on the sleeve 176 by means of an overrunning clutch 178. The drive fluid from the fluid torque converter is returned through a spline connection 179 between the shaft 10 and a splined mounting ring 180 for the runner 164, and through the conduit 32 formed between the stationary sleeve 176 and the shaft 10. The conduit 32 is connected to lubrication conduit 56 in the intermediate shaft 10 by means of feed passages 183.

Figure 3:
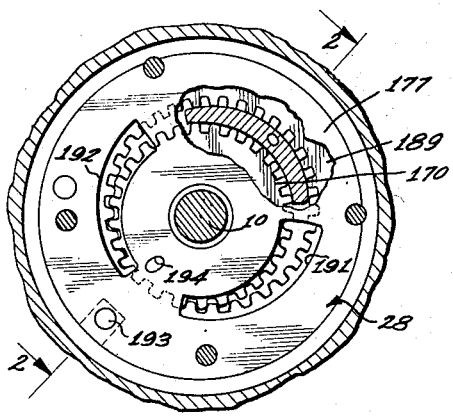
Fig. 3 is a fragmentary view taken along line 3—3 of Fig. 2 showing the hydraulic pump for the torque converter fluid and for the lubricant.
Figure 4:
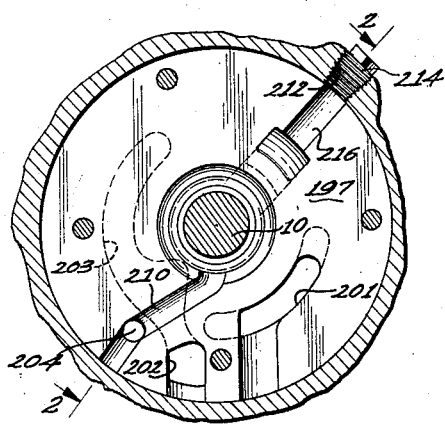
Fig. 4 is a fragmentary view taken along line 4—4 of Fig. 2 showing an oil distributor plate associated with the oil pump shown in Fig. 3.
Figure 5:
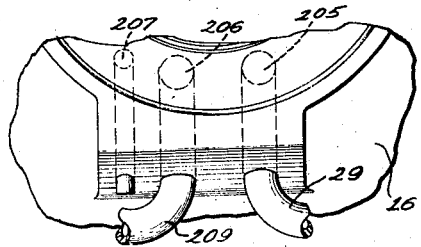
Fig. 5 is a fragmentary, sectional view taken along line 5—5 of Fig. 2 showing the relative positions within the gear transmission housing of the fluid lines leading to the pump of Fig. 3.

The construction of the gear pump 28 utilized for supplying writing fluid to the fluid torque converter and lubricating oil to the gear transmission is seen in Fig. 3. The gear 170 meshes with an internal gear 189 eccentrically mounted with respect thereto, and is rotated in a counter-clockwise direction as viewed in Fig. 3, directly from the engine shaft 2 by way of the housing 165 of the fluid torque converter 1. The face plate 177 is provided with an opening 191 that communicates with the inlet side of the pump, a pressure release opening 192 that communicates with the output side of the pump and apertures 193 and 194 leading to various oil seals of the pump. The face plate 177 is secured to the pump housing 195 by a plurality of screws 196 as shown. A distributor plate 197 (Fig. 4) is provided in order to connect the openings 191, 192, 193 and 194 in the face plate 177 with openings in the rear wall 16 of the housing 11, leading to the sump 23 (Fig. 2). Thus an aperture 201 in the distributor plate 197 is formed so as to register with the inlet opening 191 in the face plate 177, an aperture 202 communicates with a groove 203 indicated in dotted lines formed so as to register with pressure release opening 192 and a port 204 registers with drain opening 283. The apertures 201, 202 and 204 communicate through respective grooves in the face of the distributor plate as shown with openings 205 206 and 207, respectively, extending at an angle downwardly through the end wall 16 of the transmission housing as seen in Fig. 5. The opening 205 is connected to the strainer 30 (Fig. 2) by means of the fluid line 29, the the opening 206 is connected to a pressure release valve 208 by means of a line 209, and the opening 207 empties directly into the sump 23. A groove 210 in the face of the distributor plate 197 is provided for draining off fluid that passes between the intermediate shaft 10 and the distributor plate from the conduit 32. For the purpose of enabling circulating fluid to be passed through a heat exchanger, if desired, there is provided an opening 212 in the pump housing 195, shown closed by a plug 214, which registers with a passage 216 in the distributor plate 197 leading to the return conduit 32.

For proper operation of the transmission one control mechanism should be gradually applied while the one which was previously actuated is gradually released in order to provide a smooth transfer from one torque ratio to another. The control valve 5 (Fig. 1) for controlling the operation of the disc clutch 69 and the brake mechanisms for the stages 35 and 36, is shown merely by way of illustration and various other types of valves may be employed depending on the particular purpose for which the transmission is employed. The valve 5 is shown as comprising a valve body 225 provided with a mounting flange 226 for mounting the valve on a convenient support such as a bracket 227 by means of a plurality of bolts 228 which extend through holes in the mounting flange and screw into threaded openings provided therefor in the mounting bracket. The valve body 225 is provided with one inlet opening and four outlet openings. The inlet opening of the valve body 225 is connected to the discharge side of the pump 152 through the fluid line 157, and the four outlet openings are connected, respectively, to the brake cylinder 137 of the reverse speed gear stage 36 through a fluid line 230, to the brake cylinder 126 of the low forward speed gear stage 35 through the fluid line 128, to the fluid cylinder 94 for engaging the disc clutch 69 through the fluid line 106, and to the sump 23 in the housing 11 through a fluid return line 232. The valve 5 is provided with a control element (not shown) positionable by an operating handle 234, rigidly affixed thereto, for connecting a selected one of the fluid lines 230, 128, 106 and 232 to the inlet side of the valve while connecting all of the remaining fluid lines to the return line 232. The valve is provided with an indicating dial 235 traversed by a pointer 236 carried by the handle 234 and marked to indicate which of the lines 230, 128, 106 and 232 is connected to the inlet side of the valve. With the handle 234 in the position shown in Fig. 1 the control element (not shown) of the valve 5 will connect the inlet side thereof to the line 128 to apply the high pressure fluid to the brake cylinder 126 to actuate the brake mechanism for the planetary stage 35 (Fig. 2) thereby causing the transmission to operate in low forward drive. This point on the indicator dial 235 is marked with the capital letter L to indicate that the transmission will be caused to operate in low forward drive when the handle 234 is moved to a position wherein the pointer 236 is opposite this letter. The valve should include means such as a depressible spring loaded ball detent (not shown), disposed in the top surface of the valve body 225 and registering with a recess in the under surface of the handle 234 in each position of the handle wherein one of the fluid lines 232, 106, 128 and 230 is connected to the inlet side of the valve. The point on the dial 235, which is opposite the pointer 236 on the handle 234 when the inlet side of the valve is connected to the line 230 to actuate the brake mechanism of the stage 36 to thereby cause the transmission to operate in reverse drive, is marked with the letter R, and, similarly, the point on the dial, which is opposite the pointer when the line 106 which supplies fluid to the actuating piston 91 of the disc clutch 69 is connected to the inlet side of the valve, is marked with a letter H to indicate high or direct forward drive. The control valve is also provided with a neutral position wherein none of the clutch 69 and the brake mechanisms for the stages 35 and 36 is actuated and the fluid is merely circulated through the valve and back to the sump 23 through the return line 232 thereby preventing a build-up of pressure in the system. The neutral position of the handle 234 of the valve 5 is indicated with the letter N. The control element (not shown) of the valve is also provided with pressure release conduits which connect all of the lines 106, 128 and 230 except the one which is connected to the inlet of the valve, to the return line 232 in order to release the pressure from each operated actuating mechanism the moment fluid pressure is applied to another. This permits the transmission to be shifted directly from one drive to another without any intermediate clutching operation to release pressure from a previously operated stage. The transmission can, therefore, swiftly and smoothly, be shifted from one drive to another without disconnecting the load from the engine.

It should be noted that the fluid pump 28 may be utilized to furnish the fluid pressure for operating the control mechanisms of the transmission in which case the pump 152 can be dispensed with.

Figure 7:
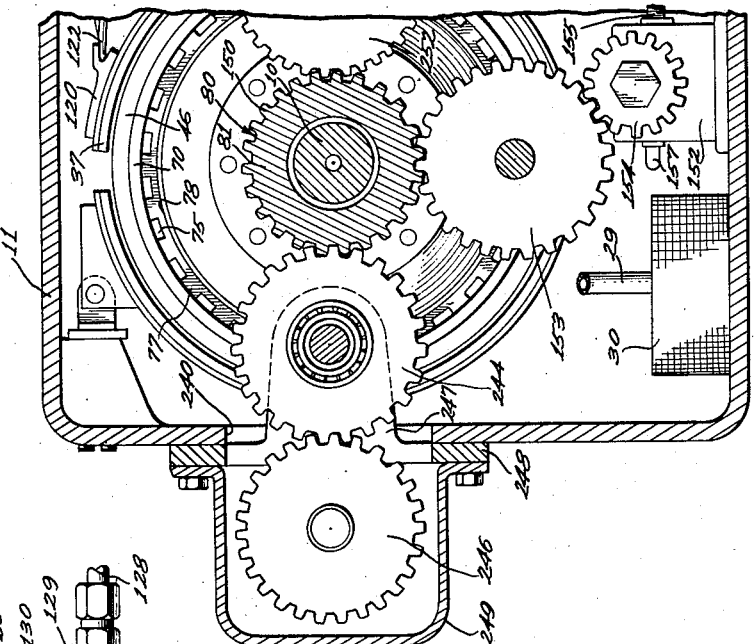
Fig. 7 is a transverse sectional view taken along line 7—7 of Fig. 2 showing the power take-off member in engagement with gears driven from opposite sides thereof.

The power take-off member 80 (Fig. 2) provides a convenient means for driving auxiliary units directly from the output of the fluid torque converter 1 from either or both sides of the transmission housing 11 through openings 240 provided therein as illustrated in Fig. 7. The power take-off openings 240 are closed off by cover plates 242 (Fig. 1) when no external connection is made to the power take-off member 80. Due to the relatively large distance between the gear 150, which is formed as an integral part of the power take-off member 80 and the side wall of the housing 11, it is necessary to utilize an idler gear 244 for connecting the gear to a driven pinion 246. The idler gear 244 is rotatably mounted between a pair of spaced ears 247 which extend inwardly from a supporting frame 248. The driven pinion 246 is shown as being enclosed within a housing 249. The pinion housing 249 and the frame 248 are bolted to the housing 11 by means of a plurality of bolts 250 with sealing gaskets interposed therebetween to form a fluid tight seal. A similar power take-off unit may be mounted in the opposite wall of the housing 11 with the idler gear 252 thereof in mesh with the power take-off gear 150 radially opposite the idler gear 244.

Coming now to the description of the operation of the device, it will first be assumed that the valve 5 (Fig. 1) is in neutral position with the pointer 236 of the valve handle 234 pointed toward the letter "N" on the indicator dial 235 wherein the hydraulic pump 152 will merely circulate fluid through the valve between the supply line 157 and the return line 205. If it is desired to drive the vehicle in which the transmission is used in forward low speed, the operator moves the valve handle 234 until the pointer 236 points to the letter "L" on the indicator dial 235. This will set the valve 5 to connect the high pressure hydraulic fluid in supply line 157 to the line 128 to the hydraulic operating cylinder 126 of the stage 35. The hydraulic pressure will be applied to the right hand side of the piston 125 (Fig. 6) to move the latter inwardly. This will move the stem 124 to the left as viewed in Fig. 6, carrying with it the clamp 120 attached to the end of brake band 37. Such movement of the clamp 120 will cause the brake band to securely grip the braking surface 47 of the orbit gear 46 (Fig. 2). With the orbit gear 46 held stationary and the sun gear 40 of the stage 35 rotating with the shaft 10, the planet gears 43 will be caused to revolve within the stationary orbit gear 46 to rotate planet carrier 44 in the same direction as the shaft 10 but at a reduced speed. Thus, if the sun gear 40 rotates in a clockwise direction as reviewed in Fig. 6 and as indicated by the arrow, the planet gears 43 will be caused to rotate in a counter clockwise direction on the planet carrier 44 and to revolve in a counterclockwise direction within the stationary orbit gear 46. The planet gears 43 will carry the planet carrier 44 with them at a reduced speed with respect to the input shaft 10 but in the same direction, that is, in a clockwise direction. This rotational movement of planet carrier 44 will be transmitted to the output shaft 4 through the spline connection 45. The planetary stage 36 will have no effect because the orbit gear 53 is free to rotate on bearings 55 with respect to the output shaft 4 and no reacting force will be applied to the planet carrier 52.

If it is now desired to shift the transmission into high speed or direct drive, the handle 234 of the control valve 5 is moved until the pointer 236 points to the letter "H" on the indicator dial 235. Hydraulic pressure will now be applied to the left-hand side of the piston 91 (Fig. 2) through the line 106 and conduit 105. The hydraulic pressure applied to the piston 91 will move the latter to the right as viewed in Fig. 2 and will impart a corresponding movement to the disc clutch actuating member 80 through the ball bearings 88. Such movement of actuating member 80 will compress the disc pack 76 to establish a driving connection between the driven clutch member 70 and the driving clutch member 71 and thereby directly couple the input shaft 10 to the output shaft 4 through the planet carrier 44. It was pointed out above that the valve 5 is constructed so that it will immediately bleed off the pressure from an actuated control unit as soon as it is operated to apply hydraulic pressure to another unit or to shunt the fluid to the return line 205.

When it is desired to drive the vehicle in reverse, the control handle 234 is shifted to the position wherein the pointer 236 will be pointed toward the letter "R" on the indicator dial 235. This will immediately bleed off the hydraulic pressure from the disc clutch 69 to permit it to assume a disengaged position and simultaneously apply fluid pressure through the fluid line 230 to the cylinder 137 of the braking mechanism of the stage 36. This will clamp the orbit gear 53 in place with respect to the gear casing 11. As the sun gear 40 of stage 35 is rotated in a counterclockwise direction as viewed from the right hand side of Fig. 2 from the fluid torque converter 1, the planet gears 43 will be rotated as before in a clockwise direction about their axes of rotation. The planet carrier 44 being keyed to the output shaft 4 will apply a reaction force against movements of the planet gears about the axis of rotation of the shaft 10 which will result in clockwise rotation being imparted to the orbit gear 46 as viewed from the right hand side of Fig. 2. Clockwise rotation of the orbit gear 46, and hence of the sun gear 48 of the stage 36 integral therewith will cause planet gears 51 to rotate in a counterclockwise direction about their axes of rotation. Orbit gear 52, being held stationary by the tightened brake band 38 of the stage 36 will cause the planet gears 51 to revolve within the orbit gear in a clockwise direction and carry the planet carrier 52 and the output shaft 4 integral therewith, with them.

It will thus be appreciated that a load connected to the output shaft 4 may be quickly and smoothly shifted from a direct drive connection with the output element of the fluid torque converter 1 to a reduced forward speed and to a reduced reverse speed without at any time being disconnected from the output of the torque converter. The time it takes for the valve 5 to be moved from one position to another and for the fluid pressure to operate the control elements is insufficient to cause any noticeable interruption in the drive connection between the intermediate shaft 10 and output shaft 4.

It will be appreciated by those skilled in the art that a small, compact and versatile transmission unit is provided. By making the gear 150 integral with the disc clutch actuating member 80, a very convenient power take-off is provided without increasing the size of the unit. By providing a removable plate 242 (Fig. 1) on both sides of the casing 11, power may readily be taken off from the output of the fluid torque converter from either or both sides of the housing. By the simple and compact construction of the operating mechanisms and of the control valve therefor, a transmission unit is provided which will require minimum attention even under the most severe operating conditions.

The simplicity of the brake mechanism, constructed in accordance with our invention, makes it easy to manufacture, assemble and install. All the parts thereof are easily accessible for inspection and servicing and are readily replaced in the field without need for any special tools. By providing a relatively large clearance between the brake adjustment rod and the pivot pin connecting it to the end of the brake band, this single adjusting member is capable of adjusting the brake band over the full required range.

If multiplied speeds are required, two planetary gear transmissions 3 may be connected in tandem, with the first one supplying the hydraulic operating pressure for the control mechanisms of the two units. The valve 5 may readily be modified by increasing the number of outlets as required and suitably modifying the control element thereof.

Although only a single embodiment of our invention has been described and illustrated herein, it will be apparent to those skilled in the art that various changes, substitutions and rearrangement of parts can be made therein without departing from the true scope of our invention.

We claim:

1. In a power transmission, the combination comprising a fluid torque converter having an input member and an output member, said input member being adapted to be driven from an engine, a multistage planetary gear unit including a reduced speed stage and a reverse reduced speed stage, an output shaft for said gear unit, said reduced speed stage having a sun gear connected to said output member of said fluid torque converter for rotation therewith, a first planet carrier mounted on said output shaft for rotation therewith, an orbit gear including a braking surface, and at least one planet gear in engagement with said sun gear and said orbit gear rotatably mounted on said first planet carrier, said reverse reduced speed stage having a gun gear rigidly connected to said orbit gear of said reduced speed stage for rotation therewith, a second planet carrier mounted on said output shaft for rotation therewith, an orbit gear including a braking surface, and at least one planet gear in engagement with said sun gear and said orbit gear rotatably mounted on said second planet carrier, hydraulically operated brake means individual to said stages for engaging respective ones of said braking surfaces of said orbit gears to selectively hold one or the other of said orbit gears stationary to effect selectively reduced drive and reduced reverse drive of said output shaft of said gear unit, hydraulically operated clutch means disposed intermediate said fluid torque converter and said reduced speed stage and connected between said output member of said torque converter and said first planet carrier of said reduced speed stage to effect direct drive between said output member and said shaft, a clutch actuating member connected for rotation with said output member and axially movable with respect thereto to control said clutch, and a gear carried by said clutch actuating member and driving hydraulic pressure producing means for controlling said clutch actuating member.

2. In a power transmission, the combination comprising a fluid torque converter having an input member and an output member, said input member being adapted to be driven from an engine, a multistage planetary gear unit including a reduced speed stage and a reverse reduced speed stage, an output shaft for said gear unit, said reduced speed stage having a sun gear mounted for rotation with said output member, a first planet carrier mounted on said output shaft for rotation therewith, an orbit gear including a braking surface, and at least one planet gear in engagement with said sun gear and said orbit gear rotatably mounted on said first planet carrier, said reverse reduced speed stage having a sun gear rigidly connected to said orbit gear of said reduced speed stage for rotation therewith, a second planet carrier mounted on said output shaft for rotation therewith, an orbit gear including a braking surface, and at least one planet gear in engagement with said sun gear and said orbit gear rotatably mounted on said second planet carrier, brake means individual to said stages for engaging respective ones of said braking surfaces of said orbit gears to selectively hold one or the other of said orbit gears stationary to effect selectively reduced drive and reduced reverse drive of said output shaft of said gear unit, clutch means having a clutch member mounted for rotation with said output member of said torque converter and a cooperating clutch member carried by said first planet carrier of said reduced speed stage on the side opposite the connection of said first planet carrier to said output shaft to effect direct drive between said output member and said shaft, hydraulic means including hydraulic pressure producing means for controlling said clutch, a clutch actuating member connected for rotation with said output member and axially movable with respect thereto to control said clutch, and a gear carried by said clutch actuating member and driving said hydraulic pressure producing means for controlling said clutch actuating member.

3. In a power transmission, the combination comprising a fluid torque converter adapted to be driven from an engine and having an output element, an output shaft for the transmission, a gear unit including a reduced speed planetary gear train and a reduced reverse speed planetary gear train for coupling said element to said output shaft, each of said planetary gear trains including a rotatable input member, a rotatably mounted reaction member including a friction surface, and a driven member connected to said output shaft for rotation therewith, a hydraulically operated friction device for each of said gear trains for engaging said friction surfaces of said reaction members thereof, means rigidly connecting said reaction member of one gear train with said input member of the other train, an annular disc clutch coaxial with and connected between said input member and said driven member of said one gear train, said clutch including a disc pack and an actuating member mounted for rotation with said output element of said fluid torque converter and movable in an axial direction between an engaged position compressing said disc pack to effect a direct drive connection between said output element of said torque converter and said output shaft and a position disengaging said disc clutch, hydraulically operated means for operating said actuating member, gear means carried by said actuating member and rotatable therewith, hydraulic pressure producing means connected to said gear means and operated therefrom, and manually operable control means for selectively connecting hydraulic pressure from said hydraulic pressure-producing means selectively to said hydraulically operated means for said disc clutch or to either one of said hydraulically operated friction devices of said gear trains.

4. In a power transmission, the combination comprising a fluid torque converter adapted to be driven from an engine and having an output element, an output shaft for the transmission, a planetary gear unit having at least one planetary gear train for coupling said output element to said output shaft, said planetary gear train including a rotatable input member, a rotatably mounted reaction member having a friction surface, and a driven member connected to said output shaft for rotation therewith, a hydraulically operated friction device for said gear train for engaging said friction surface of said reaction member, an annular disc clutch coaxial with and connected between said input member and said driven member of said gear train, said clutch including a disc pack and an actuating member mounted for rotation with said output element of said fluid torque converter and movable in an axial direction between an engaged position compressing said disc pack to effect a direct drive connection between said output element of said torque converter and said output shaft and a position disengaging said disc clutch, hydraulically operated means for operating said clutch actuating member, gear means carried by said actuating member and rotatable therewtih, hydraulic pressure producing means connected to said gear means and operated therefrom, and manually operable control means for selectively connecting hydraulic pressure from said hydraulic pressure-producing means selectively to said hydraulically operated means for said disc clutch or to said hydraulically operated friction device of said gear train.

5. A planetary gear unit including at least one planetary gear train, said planetary gear train including a rotatable input member, a rotatably mounted reaction member having a friction surface, and a driven member, a hydraulically operated friction device for said gear train for engaging said friction surface of said reaction member, an annular disc clutch coaxial with and extending about said said input member of said gear train, said clutch including a disc pack and an actuating member mounted for rotation with said input member, said actuating member being displaceable in an axial direction between an engaged position compressing said disc pack to effect a direct drive connection between said output element of said torque converter and said output shaft and a position disengaging said disc clutch, hydraulically operated means for displacing said clutch actuating member, gear means carried by said actuating member and rotatable therewith, a hydraulic pump drivably connected to said gear means and operated therefrom, and manually operable control means for selectively connecting hydraulic pressure from said hydraulic pump to said hydraulically operated means for said disc clutch and to said hydraulically operated friction devices of said gear train.

6. A planetary gear transmission comprising a rotatable input member, an output shaft, a reduced speed stage and a reduced reverse speed stage for coupling said input member to said output shaft, said reduced speed stage including a rotatable driving member connected for rotation with said input element, a reaction member having a braking surface, and a driven member connected to said output shaft, a hydraulically operated friction device for selectively engaging said braking surface to hold said reaction member stationary, said reverse speed stage including a rotatable input member rigidly connected to said reaction member of said reduced speed stage, a reaction member having a braking surface, and a driven member rigidly connected to said output shaft, a hydraulically operated friction device for selectively engaging said last named braking surface, an annular disc clutch coaxial with the axes of rotation of said input member and said driven member of said first stage, said clutch including a disc pack and an actuating member for said disc pack mounted for rotation with said input member and movable in an axial direction between a position compressing said disc pack to engage said clutch to effect a direct drive connection between said input member and said output shaft and a position releasing said disc pack to disengage said clutch, hydraulically operated means for operating said actuating means, a spur gear formed on said actuating means, a hydraulic pump connected to said gear and operated therefrom, and a manually operable control valve for selectively connecting the output of said pump to any one of said hydraulically operated friction devices and said hydraulically operated means thereby operating the transmission selectively for reduced speed forward drive, reduced speed reverse drive or direct drive.

7. In a planetary gear transmission including a housing, an input member and a driven member journaled for rotation within said housing, clutch means having one clutch member mounted on said driven member for rotation therewith but axially fixed with respect thereto and a second clutch member mounted for rotation with said input member, said clutch members being relatively movable into and out of driving engagement with each other, a clutch actuating member mounted for rotation with said input member and axially movable between a clutch engaging position in engagement with said clutch members and a clutch disengaging position, spring means in engagement with said actuating member to urge it toward clutch disengaging position, a fluid operated ring piston, a cylinder in said housing about said input member for receiving said ring piston, said piston being movable axially within said cylinder in response to applied hydraulic pressure, bearing means interconnecting said ring piston and said actuating means for common axial movements while permitting free relative rotational movements therebetween, and power take-off means on said clutch actuating member and rotatable therewith.

8. A transmission comprising in combination a housing, an oil sump in said housing, an input shaft, an output shaft, a multistage planetary gearing having an input member driven from said input shaft, each of the stages of said gearing having a driven member connected to said output shaft, a reaction member having a braking surface and a hydraulically operated brake mechanism responsive to applied hydraulic pressure for engaging the braking surface of said reaction member thereof, clutch means between said input member and the driven member of the first stage, a clutch actuating member rotatable with said input member and movable between a clutch engaging position and a clutch disengaging position, hydraulically operated means responsive to applied hydraulic pressure to displace said clutch actuating member to clutch engaging position, power take-off means on said clutch actuating means, a hydraulic pump coupled to said power take-off means and operated therefrom said pump having an intake connected to said sump, valve means having an input connection connected to said pump, said valve having separate outlets connected to respective ones of said hydraulically operated brake mechanisms, said hydraulically operated clutch actuating means and said sump, said valve including a manually movable control member settable for selectively connecting said input to any one of said brake mechanisms, said clutch actuating means and said sump, said control member including means connecting in each position of the valve all of said brake mechanisms and said clutch mechanism to the sump except the one connected to the inlet line.

9. In a power transmission, the combination comprising a fluid torque converter adapted to be driven from an engine and having an output element, an output shaft for the transmission, a gear unit including a reduced speed planetary gear train and a reduced reverse speed planetary gear train for coupling said element to said output shaft, each of said planetary gear trains including a rotatable input member, a rotatably mounted reaction member including a friction surface, and a driven member connected to said output shaft for rotation therewith, a hydraulically operated friction device for each of said gear trains for engaging said friction surfaces of said reaction members thereof, means rigidly connecting said reaction member of one gear train with said input member of the other train, an annular disc clutch coaxial with and connected between said input member and said driven member of said one gear train, said clutch including a disc pack and an actuating member mounted for rotation with said output element of said fluid torque converter and movable in an axial direction between an engaged position compressing said disc pack to effect a direct drive connection between said output element of said torque converter and said output shaft and a position disengaging said disc clutch, hydraulically operated means for operating said actuating member including a ring piston, a stationary cooperating annular recess and bearing means, said ring piston and said annular recess being concentric about the axis of said output element of said torque converter, said piston being movable axially to operate said actuator in response to fluid pressure changes within said recess, said bearing means interconnecting said ring piston and said actuator for common axial movement and relative rotational movement, gear means carried by said actuating member and rotatable therewith, hydraulic pressure producing means connected to said gear means and operated therefrom, and manually operable control means for selectively connecting hydraulic pressure from said hydraulic pressure-producing means selectively to said hydraulically operated means for said disc clutch or to either one of said hydraulically operated friction devices of said gear trains.

References Cited in the file of this patent

UNITED STATES PATENTS

| | | |
|---|---|---|
| 2,211,233 | Kelley | Aug. 13, 1940 |
| 2,237,095 | Casner | Apr. 1, 1941 |
| 2,342,880 | Masek | Feb. 29, 1944 |
| 2,345,860 | Scot-Iverson | Apr. 4, 1944 |
| 2,368,684 | Simpson | Feb. 6, 1945 |
| 2,514,963 | McRae | July 11, 1950 |
| 2,572,007 | Burnett | Oct. 23, 1951 |
| 2,616,310 | Jandasek | Nov. 4, 1952 |
| 2,645,137 | Roche | July 14, 1953 |
| 2,713,273 | Ebsworth | July 19, 1955 |
| 2,731,848 | Ebsworth | Jan. 24, 1956 |
| 2,740,303 | Bock et al. | Apr. 3, 1956 |
| 2,749,767 | Ebsworth | June 12, 1956 |
| 2,767,810 | Farkas et al. | Oct. 23, 1956 |

FOREIGN PATENTS

| | | |
|---|---|---|
| 130,830 | Sweden | Feb. 13, 1951 |